US012586447B1

(12) United States Patent
Liu et al.

(10) Patent No.: US 12,586,447 B1
(45) Date of Patent: Mar. 24, 2026

(54) STAGING PLATE FOR AN AUTOMATED TELLER MACHINE

(71) Applicant: Cardtronics USA, Inc., Atlanta, GA (US)

(72) Inventors: Zelin Liu, Monifieth (GB); Scott Low Colston, Dundee (GB); Jamie Kenneth Stewart, Dundee (GB); Matthew Bowen, Perth (GB); Callum Jacklin, Dundee (GB)

(73) Assignee: Cardtronics USA, Inc., Atlanta, GA (US)

( * ) Notice: Subject to any disclaimer, the term of this patent is extended or adjusted under 35 U.S.C. 154(b) by 0 days.

(21) Appl. No.: 19/006,519

(22) Filed: Dec. 31, 2024

(51) Int. Cl.
*G07F 19/00* (2006.01)

(52) U.S. Cl.
CPC .................................. *G07F 19/202* (2013.01)

(58) Field of Classification Search
CPC .................................................... G07F 19/202
USPC ........................................................ 235/379
See application file for complete search history.

(56) References Cited

U.S. PATENT DOCUMENTS

2006/0202023 A1* 9/2006 VanKirk .............. G06Q 20/042 235/379
2008/0128488 A1* 6/2008 Ryan ..................... G07F 19/202 235/379
2014/0229002 A1* 8/2014 Graef ................. G06Q 20/1085 235/492
2015/0100489 A1* 4/2015 Graef ................. G06Q 20/1085 705/43

* cited by examiner

*Primary Examiner* — Daniel A Hess
(74) *Attorney, Agent, or Firm* — Schwegman Lundberg & Woessner, P.A.

(57) ABSTRACT

A staging plate for an automated teller machine (ATM) is described herein. The staging plate can include a first surface configured to support media inserted into a pocket of the ATM, and a second surface connected to the first surface. The second surface can be configured to guide media handled by a user to the first surface.

18 Claims, 6 Drawing Sheets

STAGING PLATE FOR AN AUTOMATED TELLER MACHINE

TECHNICAL FIELD

Embodiments described herein generally relate to automated teller machines and more specifically to a staging plate for an automated teller machine.

BACKGROUND

An Automated Teller Machine (ATM) is an electronic device configured to provide service to users without the need for direct interaction with a person. In the context of banking services, an ATM is typically configured to dispense media (e.g., bank notes or specie), receive media (e.g., bank notes, specie, checks, etc.), or perform other transactions (e.g., transferring money between accounts, pay bills, etc.). An ATM includes both hardware and software components, enabling secure and efficient financial transactions. Usually. the hardware includes a card reader for identifying user accounts through magnetic stripe or chip-based debit or credit cards, a keypad or touchscreen for personal identification number (PIN) input and navigation, and a dispenser for media (e.g., bank notes). Other components can include a receipt printer, deposit slot, or a display screen for user interaction. The software within an ATM is usually embedded with encryption protocols and operates on secure communication networks to ensure data privacy and protection. ATMs are connected to networks (e.g., banking networks or central servers), enabling real-time account verification and transaction processing. ATMs operate using a combination of standardized protocols, such as ISO 8583, for transaction messaging and robust operating systems, often customized for security and reliability. ATMs enable customers to perform various banking tasks such as cash withdrawal, deposits, fund transfers, balance inquiries, or bill payments.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

ATM users depositing media (e.g., paper, bank notes, etc.) into the ATM can encounter a staging place as a lower receiving surface for the media. Generally, the staging plate helps to direct a user to position the notes in such a way that other elements of the pocket assembly can accept the media. Often, the staging plate includes a recess so that a user can maintain a grip on the media. However, an issue can arise when the finger recess, or corresponding feature, of the staging plate is about as large, or larger, than a smallest edge of media (e.g., edgewise) accepted by the ATM when the ATM is configured to accept media oriented so that the longest edge (e.g., lengthwise) of the media is inserted first. Here, a user can confuse the finger recess for the acceptor slot and misorient the media upon insertion.

To address these issues, a staging plate with a ramp like orientation between a guide surface and a support surface. The guide surface can include a central indentation (e.g., a finger recess) that is narrower than a smallest edge of media accepted by the ATM. The guide surface can also include two raised guides that are spaced further apart than the shortest edge of the smallest media accepted by the ATM. In conjunction, these features help to ensure that users present media lengthwise for acceptance by the ATM. Additional examples and details provided below.

Figure 1:
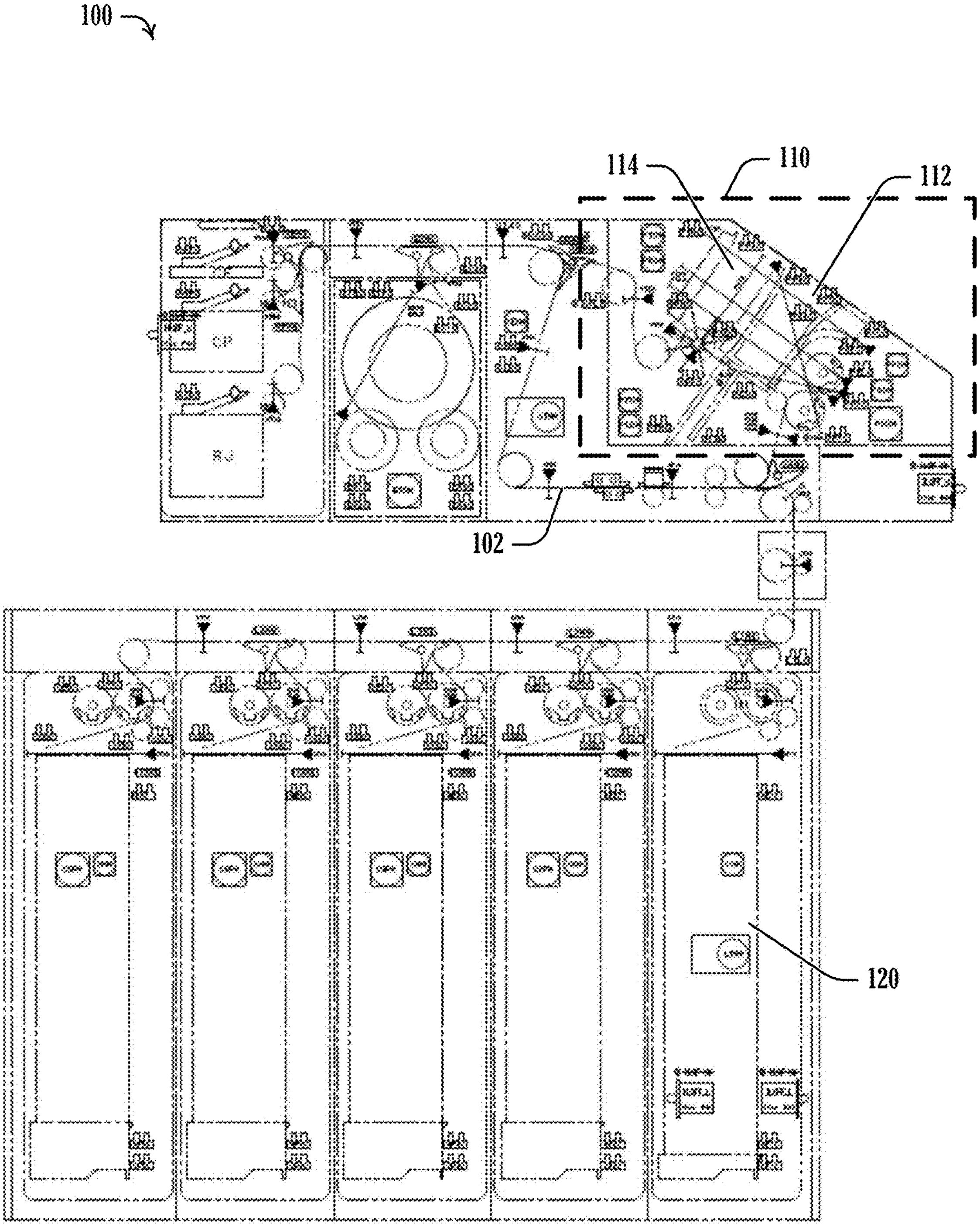
FIG. 1 illustrates an example of an ATM, according to an embodiment.

FIG. 1 illustrates an example of an ATM 100, according to an embodiment. The ATM 100 includes a pocket assembly 110. Here, the pocket assembly 110 is divided into a bottom compartment 112 and a top compartment 114. The pocket assembly 110 serves as the primary area for receiving and processing media (e.g., bank notes, receipts, etc.) within the ATM 100. The bottom compartment 112 and the top compartment 114 are configured to facilitate movement or storage of media during various stages of a transaction.

The ATM 100 can include one or more note storage compartments 120 (e.g., cassettes). A belt 102 or other transport mechanism can be coupled between various components in the pocket assembly 110 and the note storage compartments 120. The note storage compartments 120 are connected to the pocket assembly 110 and provide a secure location for storing media in the ATM 100 before, during, or after processing. The note storage compartments 120 can be configured to organize ATM media to, for example, be ready for future transactions or for collection. The connection between the pocket assembly 110 and the note storage compartment 120 enables efficient transfer or storage of media within the ATM 100.

Figure 2A:
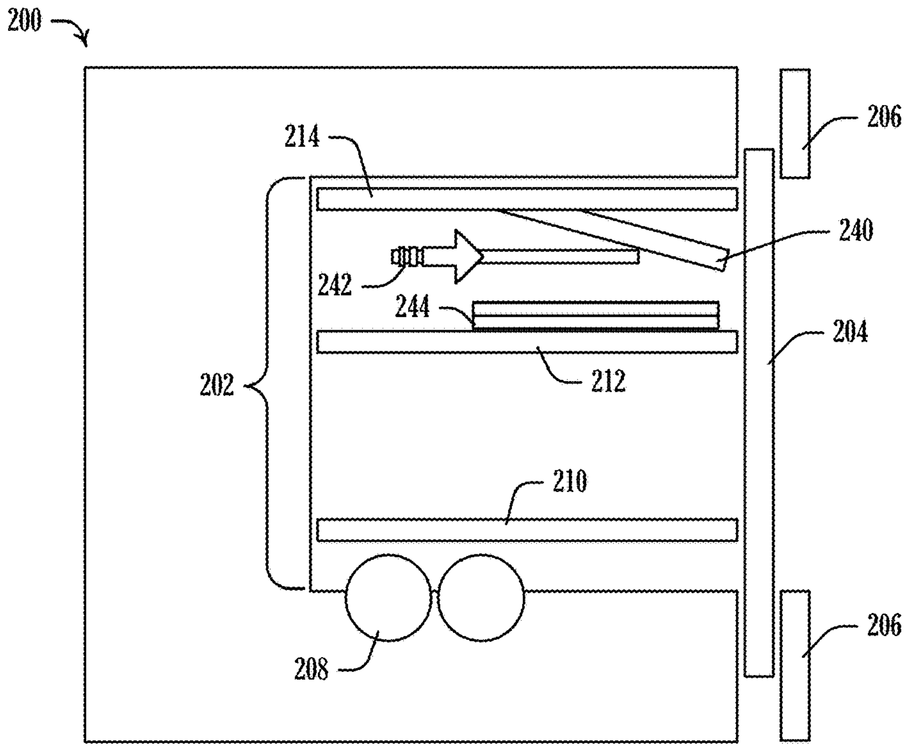
FIGS. 2A and 2B illustrate an example of a pocket assembly, according to an embodiment.
Figure 2B:
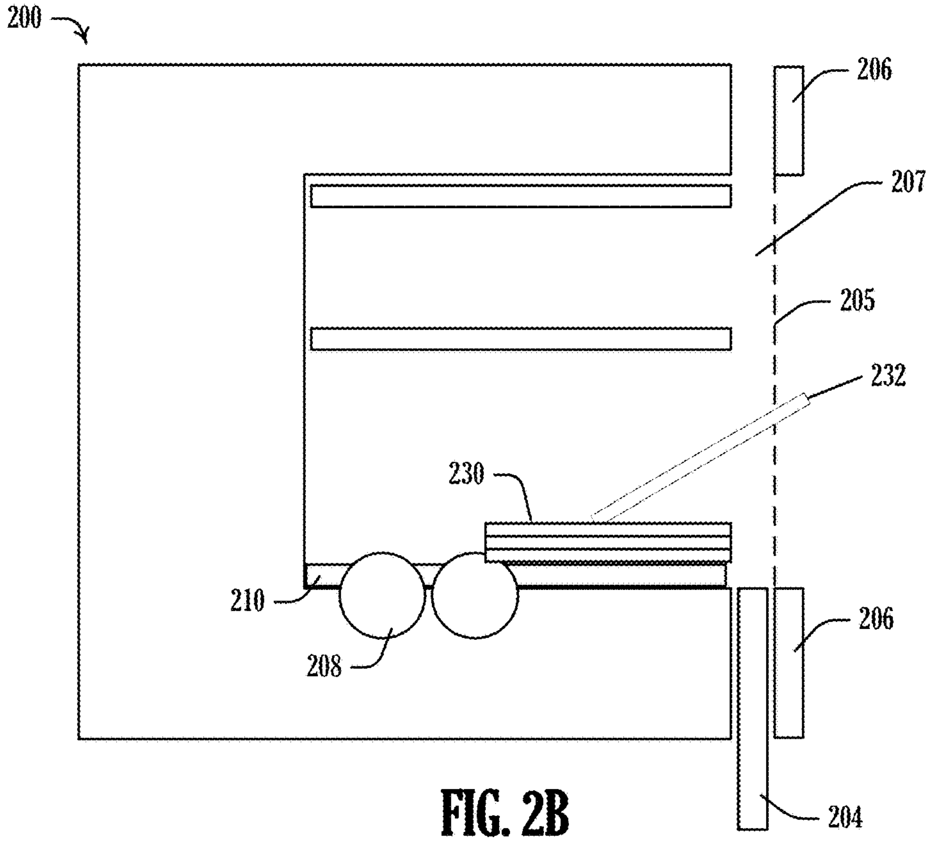

FIG. 2A and FIG. 2B illustrate an example of a pocket assembly 200 similar to the pocket assembly 110 illustrated in FIG. 1, according to an embodiment. As illustrated, the pocket assembly 200 includes a pocket 202, which serves as the primary area to receive media. The fascia 206 is located on an exterior surface of the ATM, surrounding the pocket 202 and providing an interface for users. The shutter 204 is movable to, as illustrated in FIG. 2A cover the pocket 202 when in a closed position or to reveal the pocket 202 to a user in an open position as illustrated in FIG. 2B. Within the pocket is a staging plate 210 and a pusher plate 212 that can move up and down to facilitate the handling of media.

In the position shown in FIG. 2A, the staging plate 210 and the pusher plate 212 define a bottom compartment, like the bottom compartment 112 from FIG. 1. In operation, a stack of media 230 is inserted onto the staging plate 210 and the staging plate is lowered as illustrated in FIG. 2B. One or more rollers 208 can protrude through the staging plate 210 in FIG. 2B and are used to transport individual pieces of the media 232 within the ATM. In an example, the pusher plate 212 is also lowered to apply pressure to the stack of media 230 (e.g., a stack of bank notes) while the rollers 208 engage the stack, although not shown in FIG. 2B.

The roof plate 214 is positioned above the pusher plate 212 in the pocket 202. In an example, the roof plate 214

(e.g., top plate) is also movable up and down within the pocket 202. In an example, the roof plate 214 does not move, but includes one or more movable portions 240, such as a deflector to deflect a moving piece of media 242 into a stack 244 in the top compartment, to, for example, dispense or return media to a user, when the shutter 204 is open.

A slot 207 is configured to guide the shutter 204 between the closed (e.g., extended) position illustrated in FIG. 2A and the open (e.g., retracted) position illustrated in FIG. 2B. An edge of the slot 207 is shown by dashed line 205, and the slot 207 is located between the pocket 202 and the fascia 206 of the ATM.

Figure 3:
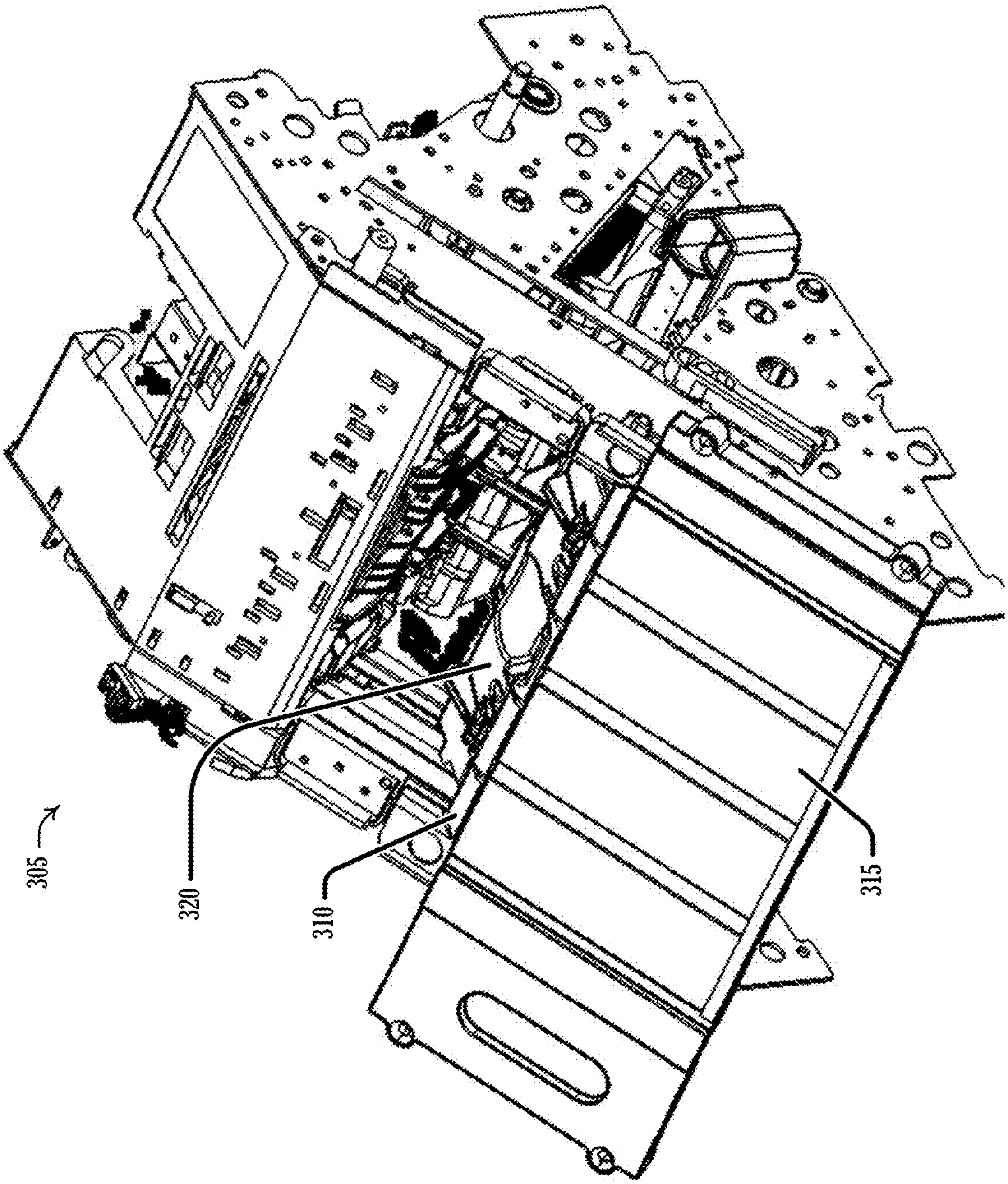
FIG. 3 illustrates a look into a pocket assembly including a staging plate, a lower pocket cover, and a shutter, according to an embodiment.

FIG. 3 illustrates a look into a pocket assembly 305 including a staging plate 320, a lower pocket cover 310, and a shutter 315, according to an embodiment. When in operation, the shutter 315 (e.g., shutter blade) moves upwards to cover the pocket (e.g., acceptor area of the pocket) and prevent users from reaching into the pocket. The lower pocket cover 310 does not move during normal operation, but rather is configured to provide an enclosure to the lower portion of the pocket and the components therein. The staging plate 320 interfaces with the lower pocket cover 310 at various points in the operation of the ATM, including during the acceptance of media from a user.

Figure 4:
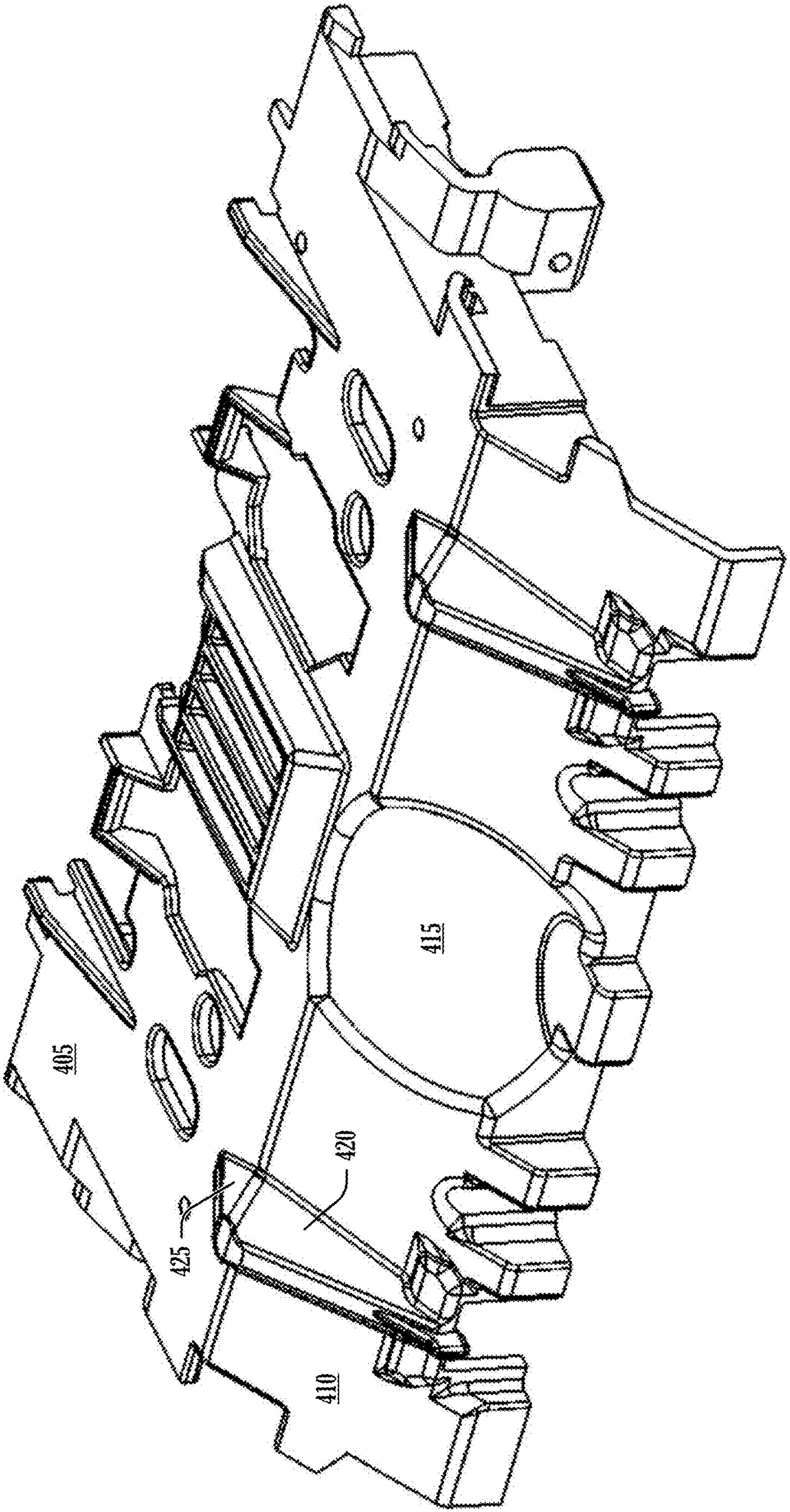
FIG. 4 illustrates a staging plate, according to an embodiment.

FIG. 4 illustrates a staging plate, according to an embodiment. The staging plate includes a first surface 405 configured to support media inserted into a pocket of the ATM and the staging plate includes a second surface 410 connected to the first surface 405. The second surface 410 is configured to guide media handled by a user to the first surface 405 when the staging plate is in use on the ATM. In an example, an exterior angle between the first surface 405 and the second surface 410 is greater than 180 degrees and less than 270 degrees to form a ramp-like relationship between the first surface 405 and the second surface 410.

In an example, the second surface 410 includes a central indentation formed from an ovoid surface 415. This central indentation operates as a finger recess or merely a centering target for users. Here, being central means that the central indentation is generally aligned with a center position of media acceptance for the pocket when installed in the ATM. In an example, a greatest span of the central indentation is less than a shortest edge of a smallest media accepted by the ATM. The purpose of this feature to avoid confusing users that the central indentation is the acceptor area with an edgewise media insertion orientation. When the central indentation is smaller that the small edge of this media, users will be less likely to try and insert media in this orientation.

In an example, the second surface 410 includes two raised guides, the two raised guides extending perpendicular from a dominant plane of the second surface 410. The raised guide 420 illustrates the perpendicular extension of these raised guides from the second surface 410. In an example, the raised guides terminate at corresponding guides on the first surface 405. For example, the raised guide 420 terminates with the raised guide 425 on the first surface 405. Thus, the raised guides provide a visual and tactile instruction to users inserting media that first encounter the second surface 410 and then slide the media to the first surface 405 for acceptance by the ATM.

In an example, the raised guides are space equidistant from a mid-point of a long axis of the second surface 410. Thus, the raised guides are generally centered on the staging plate (e.g., with respect to the acceptor area of the pocket). In an example, the raised guides span the second surface 410 in a direction of a short axis of the second surface 410. This is the situation illustrated in FIG. 4. In an example, a distance between the raised guides is greater than a shortest edge of a smallest media accepted by the ATM. In an example, the distance between the raised guides is less than a longest edge of a smallest media accepted by the ATM. These last two examples further help users to orient media lengthwise for insertion into the ATM. Because the guides are spaced further apart than the smallest edge of the smallest media, the media will not be supported by both guides if inserted edgewise. However, by being closer together than the longest edge of the smallest media, then both guides will support media being inserted lengthwise.

Figure 5:
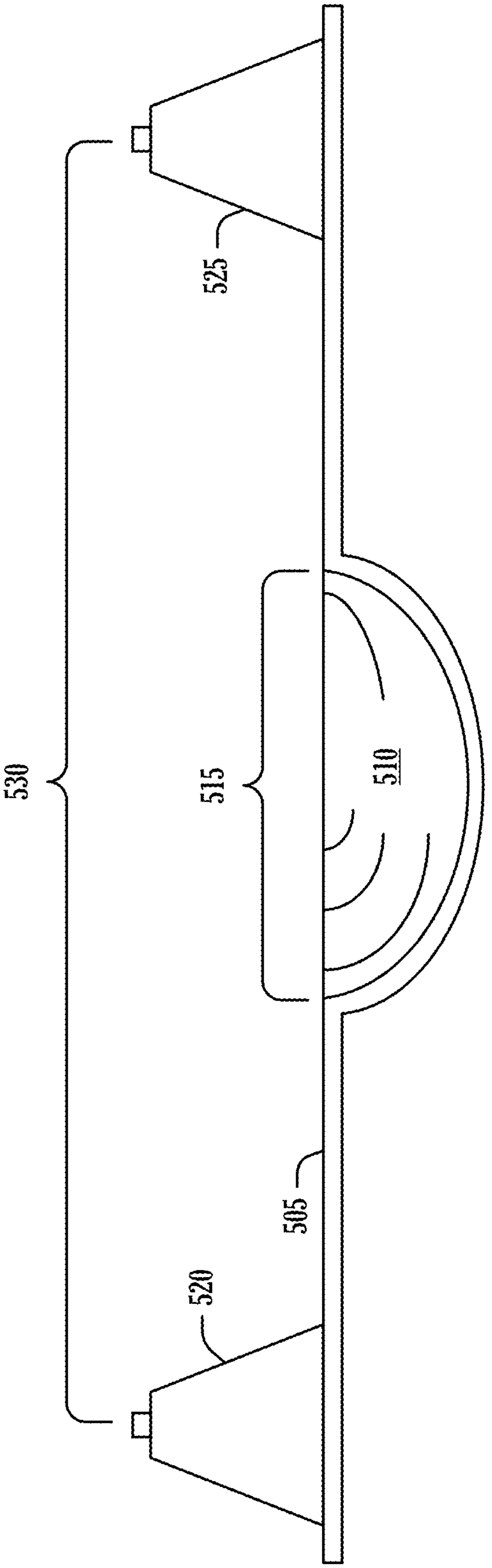
FIG. 5 illustrates features of a surface of a staging plate, according to an embodiment.

FIG. 5 illustrates features of a surface of a staging plate, according to an embodiment. The view is along the dominant plane of the guide surface 505 (e.g., the second surface 410 illustrated in FIG. 4). The guide surface 505 includes a central indentation 510. In an example, the central indentation 510 is formed from a semi-spherical (e.g., concave) surface (as illustrated), though other surface geometries can be used, such as a collection of flat surfaces. In an example, the greatest span 515 of the central indentation 510 is less than a shortest edge of a smallest media accepted by the ATM.

In an example, the guide surface 505 a first raised guide 520 and a second raised guide 525. The two raised guides extend perpendicular from a dominant plane of the guide surface 505. This relationship is illustrated in FIG. 5. As illustrated, the raised guides can include a complex geometry that builds height from the guide surface 505 while reducing friction to media encountering the tops of the raised guides.

The spacing and positioning of the first raised guide 520 and the second raised guide 525 help users to orient media for insertion into the ATM. Accordingly, in an example, the raised guides are space equidistant from a mid-point of a long axis of the guide surface 505. This orientation is configured to put the center point of the space between the raised guides to also center on, for example, the central indentation 510, or the center of the acceptor area in the pocket.

In an example, the distance between the raised guides 530 is greater than a shortest edge of a smallest media accepted by the ATM. In an example, the distance between the raised guides 530 is less than a longest edge of a smallest media accepted by the ATM. Again, these last two examples further help users to orient media lengthwise for insertion into the ATM. Because the guides are spaced further apart than the smallest edge of the smallest media, the media will not be supported by both guides if inserted edgewise. However, by being closer together than the longest edge of the smallest media, then both guides will support media being inserted lengthwise.

Figure 6:
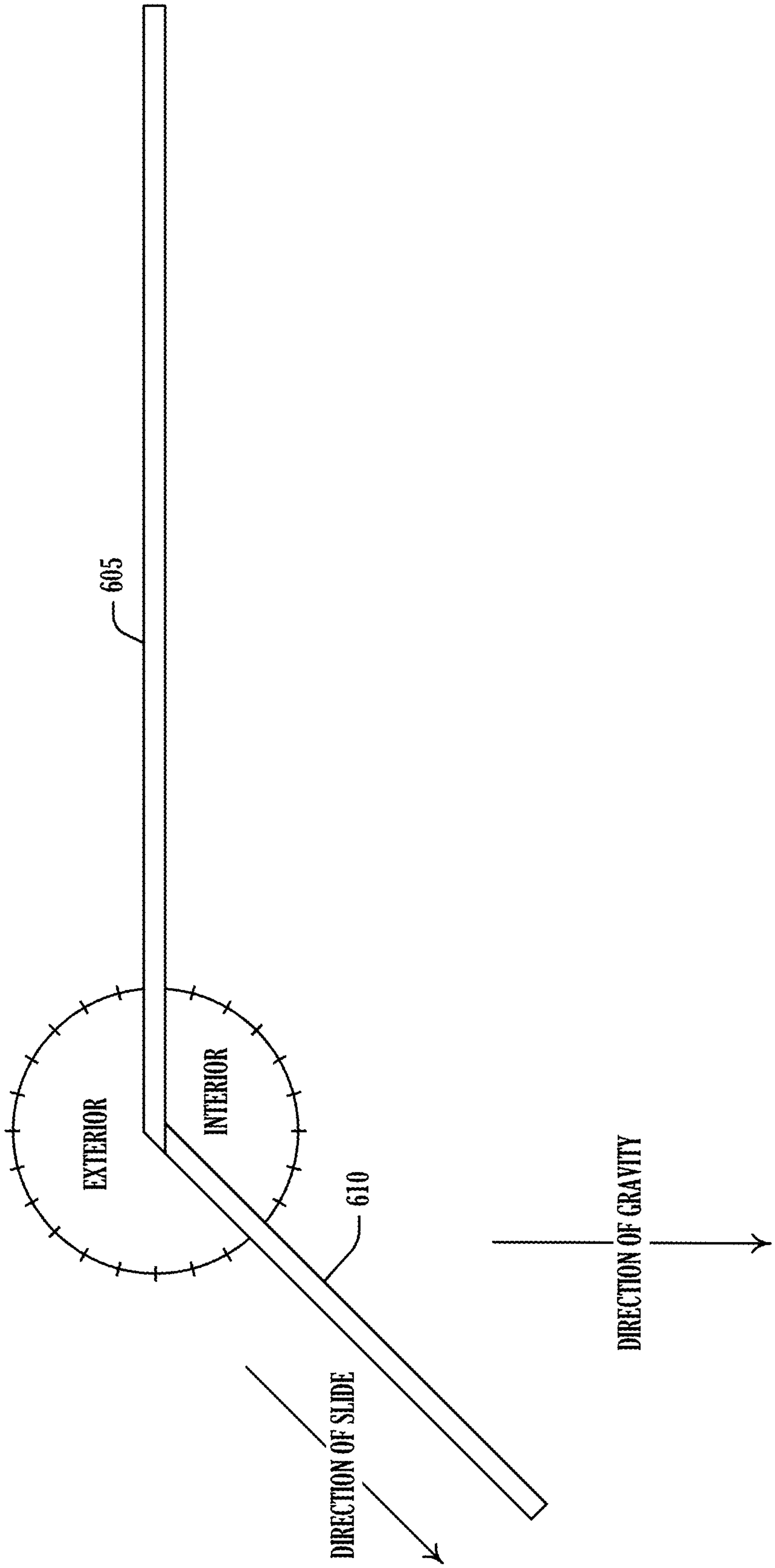
FIG. 6 illustrates a profile of a staging plate, according to an embodiment.

FIG. 6 illustrates a profile of a staging plate, according to an embodiment. The first surface 605 is similar to the first surface 405 illustrated in FIG. 4, and the second surface 610 is similar to the second surface 410 illustrated in FIG. 4 and the guide surface 505 illustrated in FIG. 5. As noted earlier, in an example, the exterior angle between the first surface 605 and the second surface 610 is greater than 180 degrees and less than 270 degrees. This example enables a user to push media, held generally parallel to the first surface 605, into the second surface 610, and have the second surface 610 operate as a ramp towards the first surface 605. In an example, the exterior angle between the first surface and the second surface is 225 degrees or less.

ADDITIONAL NOTES & EXAMPLES

Example 11 is a staging plate for an automated teller machine (ATM), the staging plate including: a first surface configured to support media inserted into a pocket of the ATM; and a second surface connected to the first surface, an exterior angle between the first surface and the second surface being greater than 180 degrees and less than 270 degrees, wherein the second surface is configured to guide media handled by a user to the first surface.

In Example 12, the subject matter of Example 11, wherein the exterior angle between the first surface and the second surface is 225 degrees or less.

In Example 13, the subject matter of any of Examples 11-12, wherein the second surface includes a central indentation formed from a concave surface.

In Example 14, the subject matter of Example 13, wherein a greatest span of the central indentation is less than a shortest edge of a smallest media accepted by the ATM.

In Example 15, the subject matter of any of Examples 11-14, wherein the second surface includes two raised guides, the two raised guides extending perpendicular from a dominant plane of the second surface.

In Example 16, the subject matter of Example 15, wherein the two raised guides terminate at corresponding guides on the first surface.

In Example 17, the subject matter of any of Examples 15-16, wherein the two raised guides are space equidistant from a mid-point of a long axis of the second surface.

In Example 18, the subject matter of any of Examples 15-17, wherein the two raised guides span the second surface in a direction of a short axis of the second surface.

In Example 19, the subject matter of any of Examples 15-18, wherein a distance between the two raised guides is greater than a shortest edge of a smallest media accepted by the ATM.

In Example 20, the subject matter of Example 19, wherein a distance between the two raised guides is less than a longest edge of a smallest media accepted by the ATM.

Example 21 is an automated teller machine (ATM) comprising: a pocket assembly that forms a pocket; and a staging plate as part of the pocket assembly, the staging plate including: a first surface configured to support media inserted into the pocket; and a second surface connected to the first surface, an exterior angle between the first surface and the second surface being greater than 180 degrees and less than 270 degrees, wherein the second surface is configured to guide media handled by a user to the first surface.

In Example 22, the subject matter of Example 21, wherein the exterior angle between the first surface and the second surface is 225 degrees or less.

In Example 23, the subject matter of any of Examples 21-22, wherein the second surface includes a central indentation formed from a concave surface.

In Example 24, the subject matter of Example 23, wherein a greatest span of the central indentation is less than a shortest edge of a smallest media accepted by the ATM.

In Example 25, the subject matter of any of Examples 21-24, wherein the second surface includes two raised guides, the two raised guides extending perpendicular from a dominant plane of the second surface.

In Example 26, the subject matter of Example 25, wherein the two raised guides terminate at corresponding guides on the first surface.

In Example 27, the subject matter of any of Examples 25-26, wherein the two raised guides are space equidistant from a mid-point of a long axis of the second surface.

In Example 28, the subject matter of any of Examples 25-27, wherein the two raised guides span the second surface in a direction of a short axis of the second surface.

In Example 29, the subject matter of any of Examples 25-28, wherein a distance between the two raised guides is greater than a shortest edge of a smallest media accepted by the ATM.

In Example 30, the subject matter of Example 29, wherein a distance between the two raised guides is less than a longest edge of a smallest media accepted by the ATM.

Example 31 is at least one machine-readable medium including instructions that, when executed by processing circuitry, cause the processing circuitry to perform operations to implement of any of Examples 11-30.

Example 32 is an apparatus comprising means to implement of any of Examples 11-30.

Example 33 is a system to implement of any of Examples 11-30.

Example 34 is a method to implement of any of Examples 11-30.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A staging plate for an automated teller machine (ATM), the staging plate including:

a first surface configured to support media inserted into a pocket of the ATM; and a second surface connected to the first surface, an exterior angle between the first surface and the second surface being greater than 180 degrees and less than 270 degrees, wherein the second surface is configured to guide media handled by a user to the first surface, and wherein the second surface includes a central indentation formed from a concave surface.

2. The staging plate of claim 1, wherein the exterior angle between the first surface and the second surface is 225 degrees or less.

3. The staging plate of claim 1, wherein a greatest span of the central indentation is less than a shortest edge of a smallest media accepted by the ATM.

4. The staging plate of claim 1, wherein the second surface includes two raised guides, the two raised guides extending perpendicular from a dominant plane of the second surface.

5. The staging plate of claim 4, wherein the two raised guides terminate at corresponding guides on the first surface.

6. The staging plate of claim 4, wherein the two raised guides are space equidistant from a mid-point of a long axis of the second surface.

7. The staging plate of claim 4, wherein the two raised guides span the second surface in a direction of a short axis of the second surface.

8. The staging plate of claim 4, wherein a distance between the two raised guides is greater than a shortest edge of a smallest media accepted by the ATM.

9. The staging plate of claim 8, wherein a distance between the two raised guides is less than a longest edge of a smallest media accepted by the ATM.

10. An automated teller machine (ATM) comprising:

a pocket assembly that forms a pocket; and a staging plate as part of the pocket assembly, the staging plate including:

a first surface configured to support media inserted into the pocket; and a second surface connected to the first surface, an exterior angle between the first surface and the second surface being greater than 180 degrees and less than 270 degrees, wherein the second surface is configured to guide media handled by a user to the first surface, wherein the second surface includes a central indentation formed from a concave surface.

11. The ATM of claim 10, wherein the exterior angle between the first surface and the second surface is 225 degrees or less.

12. The ATM of claim 10, wherein a greatest span of the central indentation is less than a shortest edge of a smallest media accepted by the ATM.

13. The ATM of claim 10, wherein the second surface includes two raised guides, the two raised guides extending perpendicular from a dominant plane of the second surface.

14. The ATM of claim 13, wherein the two raised guides terminate at corresponding guides on the first surface.

15. The ATM of claim 13, wherein the two raised guides are space equidistant from a mid-point of a long axis of the second surface.

16. The ATM of claim 13, wherein the two raised guides span the second surface in a direction of a short axis of the second surface.

17. The ATM of claim 13, wherein a distance between the two raised guides is greater than a shortest edge of a smallest media accepted by the ATM.

18. The ATM of claim 17, wherein a distance between the two raised guides is less than a longest edge of a smallest media accepted by the ATM.

* * * * *